(12) United States Patent
Forman et al.

(10) Patent No.: US 8,352,396 B2
(45) Date of Patent: Jan. 8, 2013

(54) SYSTEMS AND METHODS FOR IMPROVING WEB SITE USER EXPERIENCE

(75) Inventors: George Forman, Port Orchard, WA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 12/555,638

(22) Filed: Sep. 8, 2009

(65) Prior Publication Data

US 2011/0060716 A1 Mar. 10, 2011

(51) Int. Cl.
- *G06F 15/18* (2006.01)
- *G06F 17/00* (2006.01)
- *G06F 7/00* (2006.01)

(52) U.S. Cl. ............. 706/45; 706/12; 707/600; 707/705

(58) Field of Classification Search ........................ None
See application file for complete search history.

(56) References Cited

U.S. PATENT DOCUMENTS

| | | | |
|---|---|---|---|
| 6,839,680 | B1 | 1/2005 | Liu et al. |
| 2003/0101449 | A1 | 5/2003 | Bentolila et al. |
| 2008/0126176 | A1 | 5/2008 | Iguchi |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/ 2010.
Hottolink Inc.; "Recognize" Online, http://www.hottolink.co.jp/english/reconize.html, 2009.
Andrejko et al.: User Characteristics Acquisition from Logs with Semantics 8. Slovak University of Technology in Bratislava.
Hongjun Lu et al: Extending a Web Browser with Client-Side Mining, Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India, 2008.
Shahabi et al.; "Yoda an Accurate and Scalable Web based Recommendation System?" University of Southern California, Los Angeles, Sep. 2001.
Why Wubat? Website User Behavior & Analysis Tool, Wubat, Online, http://www.wubat.com/, copyright: 2008.
Claypool et al.; "Implicit Interest Indicators", 14. Worcester Polytechnic Institute, Worcester, Computer Science Department Worcester Polytechnic Institute Worcester, MA 01609, USA., 2001.
Shahabi et al.; A Framework for Efficient and Anonymous Web Usage Mining Based on Client-Side Tracking, 15. University of Southern California, Los Angeles, 2002.
Chattertrap; Online http://www.chattertrap.com; Jul. 20, 2010.
HSNW: SRI defense technology spawns civilian application: published Jun. 29, 2010.
Anthony Ha: Facebook investor backs Chattertrap, a personal assistant for content, Jun. 28, 2010.

*Primary Examiner* — Alan Chen (57) ABSTRACT

Methods, systems, and computer program products are provided for personalizing web sites. A model based on mining web usage data is accessed. The model defines associations between web sites. Interest associations extracted from web interactions are stored. The interest associations comprise interest indications and web sites associated with the interest indications. An interest indication from the interest associations is selected. The interest indication is associated with an associated web site. The associated web site has an association with a target web site as defined by the model. The interest indication is sent to the target web site.

22 Claims, 5 Drawing Sheets

FIG. 1A

MODEL 140

NETFLIX.COM
    37% BLOCKBUSTER.COM
    25% MININOVA.ORG
    19% IMDB.COM
    16% POGO.COM FOODNETWORK.COM
    50% WEIGHTWATCHERS.COM
    46% ALLRECIPES.COM DEVRYU.NET
    33% MYECLASSONLINE.COM
    25% KUCOURSES.COM GOOGLE.COM
    99% FACEBOOK.COM
    78% BLINGO.COM
    72% WINZY.COM
    72% NETSCAPE.COM
    72% IRS.GOV
    70% YAHOO.COM
    70% COMCAST.NET
    69% WIKIPEDIA.ORG
    68% FINDSTUFF.COM
    68% ATOMZ.COM
    66% AOL.COM
    65% MYPOINTS.COM EBAY.COM
    33% AMAZON.COM
    31% TARGET.COM
    29% WALMART.COM
    26% BESTBUY.COM
    18% WINZY.COM
    18% BLOCKBUSTER.COM
    15% ATOMZ.COM
    11% GOODSEARCH.COM
    10% GOOGLE.COM
    10% FINDSTUFF.COM

SYSTEMS AND METHODS FOR IMPROVING WEB SITE USER EXPERIENCE

BACKGROUND OF THE INVENTION

It is commonly known that the vast amount of information available on the Internet is growing exponentially. Since this information may be distributed through a large number of web pages at various web sites, a typical web user seeking information often performs keyword searches at search engine sites (such as Google) as well as at other web sites that may specialize in the type of information the user is looking for (e.g., at an online auto parts retailer web site). During the user's search process, the user may visit and search within a variety of different web sites. When the user first arrives at a web site, many such web sites seek to place on the landing web page the most relevant information or products that they have available.

BRIEF DESCRIPTION OF THE DRAWINGS

Embodiments of the invention relating to both structure and method of operation may best be understood by referring to the following description and accompanying drawings.

DETAILED DESCRIPTION

Novel features believed characteristic of the present disclosure are set forth in the appended claims. The disclosure itself will best be understood by reference to the following detailed description of an illustrative embodiment when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, recent usage data may be configured to be collected over a defined time period of 1 hour, and historical usage data may be configured to be collected over a defined time period of 1000 hours.

Data Mining—Data mining may be defined as a process of sorting through data retrieved from large data stores or sets to identify patterns and establish relationships. When used as a customer relationship management (CRM) tool, data mining can take advantage of a large amount of information gathered by data stores such as web sites to look for patterns in user behavior.

Model—A model can be a representation of the characteristics and behavior of a system, element, solution, or service. A model as described herein captures the design of a particular information technology (IT) system, element, solution, or service. The model can be a declarative specification of the structural, functional, non-functional, and runtime characteristics of the IT system, element, solution, or service. The instantiation of a model creates a model instance.

Example embodiments of methods, systems, and computer program products are provided for improving user's web surfing experience, e.g., by personalizing web sites. Web usage data obtained from several users and several web sites is mined to configure a model, the model defining associations between web sites receiving common search queries from various users. Web interactions of a user are monitored, and from these web interactions interest associations are extracted, the interest associations can include interest indications and web sites associated with each interest indication. When the user arrives at a target web site, at least one search query is selected from the user's observed interest associations based on the association between the target web site and the web sites associated with each interest indication. The interest indication is sent to the target web site for performing the web personalization, thereby improving the user's web surfing experience.

Example embodiments of systems and methods disclosed herein enable web sites to automatically provide personalized information to users based on their past interest indications at various other web sites. For example, the systems disclosed herein may include an electronic assistant tool. A user may benefit from having an electronic assistant that is capable of recognizing a problem and suggesting a solution, e.g., "I see you are not finding what you want at allrecipes.com web site. Based on the data mining results of millions of other web users, another likely site for your search is foodnetwork.com". Thus, tools and techniques described herein improve the likelihood of a web site being able to deliver information of interest to a user who may be hopping from one web site to another in search of the desired information content.

Figure 1A:
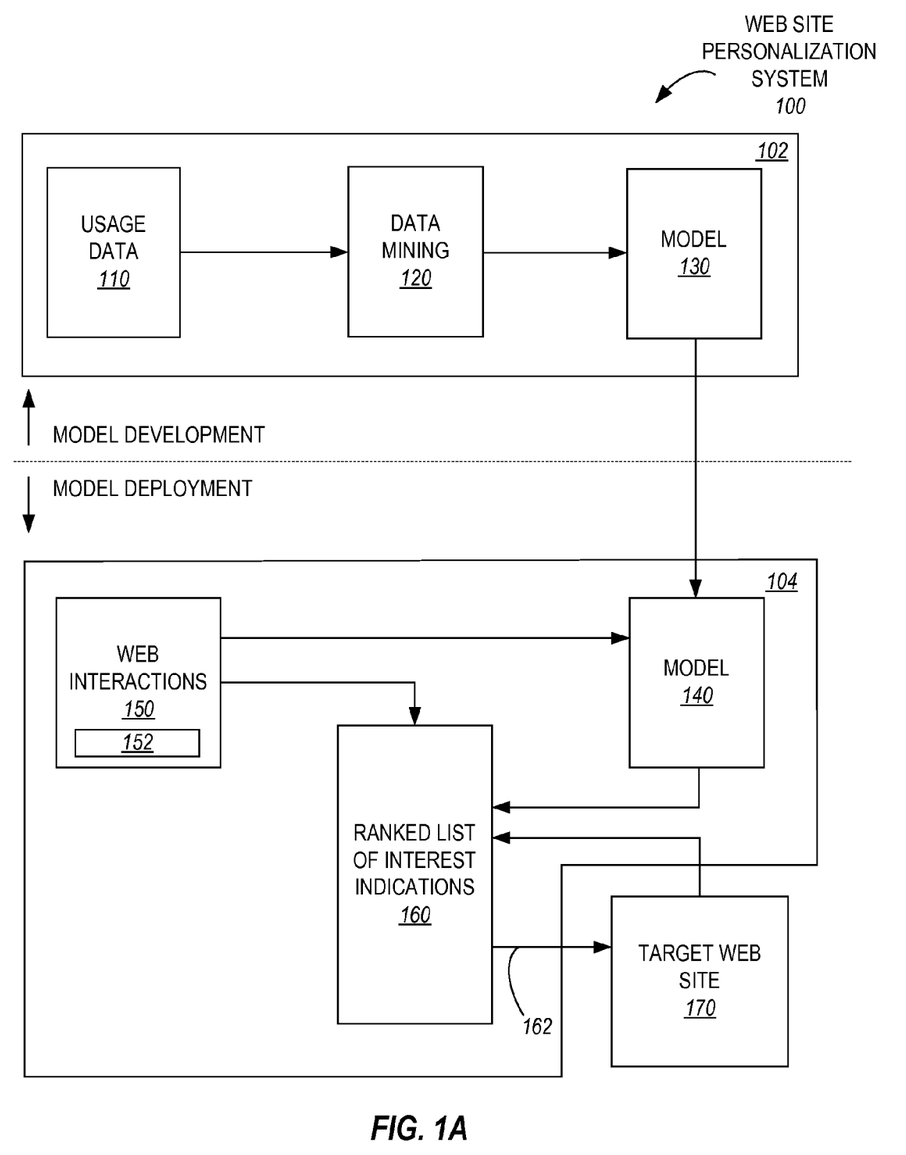
FIG. 1A illustrates a block diagram of a web site personalization system, according to an example embodiment.

FIG. 1A illustrates a block diagram of a web site personalization system 100, according to an example embodiment. The system 100 includes computer server 102 or other suitable computer processor that can generate/access/store usage data 110, execute data mining logic instructions 120, and generate model 130. The system 100 can further include client computer 104 or other suitable computer processor that can generate/access/store model 140, execute web interactions logic instructions 150, generate/store interest associations 152, generate/access interest indications 160, and communicate with another computer that hosts one or more target web sites 170 via a suitable information network such as the Internet.

Usage data 110 may be collected from a large volume of users accessing a large number of web sites on the Internet.

For example, the usage data 110 may be obtained via the commercially available MEGAPANEL™ product offered by Nielsen/NetRatings, a global Internet media and market research company. The usage data 110 may include on-line and historical data associated with users and web sites. User-related usage data may include user profiles, actions, inputs, queries, navigational selections and others, and web site related usage data may include web content, structure, and web log data.

Data mining logic instructions 120 access the usage data 110 to develop a model 130. Specifically, the usage data 110 may be mined to extract interest associations, which comprise at least an interest indication and a web site indication, where an "interest indication" is a representation of the fact that a user may have been, in the observed usage, interested in finding information about a particular topic. As described herein, an interest association is an indication that the indication of interest is associated with an interaction with the given web site. The topic may, without limitation, be a product that the user may have been looking to buy, a general category of product the user may have been shopping for, a news topic the user may have been looking for information on, an event the user may be considering attending, or a topic the user may be wishing to learn about.

In many instances the interest indication may reflect a search query that may have been entered by the user. Such a search query may have been typed into a search box on the web site or on a general search web site such as Google. In the latter case, the association with the web site may arise from the user selecting a link into the web site from the search results. The interest indication may take forms other than textual strings. For example, it may take the form of a sound clip, an image, a video clip, or a document. It may be explicitly provided by a user, e.g., by typing words into a text box or by otherwise selecting values on a web-based form, or it may be inferred by observing the user's behavior, e.g., by noting text the user clicks on or topics associated with pages the user chooses to visit.

In some applications, the interest indication may be generated by entities other than the user. For example, it may be generated by a web site, the user's browser, or other software, including software based on this invention, that endeavors to infer the user's interest in discovering information about a topic. As described herein, references to a "query", "search", "search query", or "query string" should, to the extent possible, be interpreted broadly to include all forms of the interest indication. In addition, as described herein, the phrase "web site" is used with reference to the data used to build the model. This should be read as a web site indication of a web site rather than an actual web site (e.g., a server or process capable of responding to requests). The web site indication may not necessarily correspond to any single server or system. In some embodiments the interest associations may be more general records that contain other information such as timestamps, indications of user identity or user demographic information such as age, sex, or geographic location.

The model 130 defines quantified associations between web sites having common interest indications (and, by inference, between other pairs of web sites). A quantified association, as described herein, between two web sites may be a determined number or set of numbers (or other indications of magnitude, including categorical labels such as "very high", "high", and "low") that indicates the degree (or, if several numbers are used, degrees along multiple axes) with which one web site is to be thought of as related to the other, similar to the other, or any other like notion. In some embodiments, the value of the quantified association between two web sites may be based on the number or proportion of interest indications associated with one web site that are also associated with the other web site.

The value of quantified association may be meaningful in and of itself or it may otherwise allow an inference that one web site may be more strongly associated with a second compared to a third one. The model 130 may be deployed as a run-time model 140 that is accessible on-line to authorized users and web sites. In various embodiments, the model 140 may be accessible to a service provider configured to either (a) receive a query from a web site of the form "This user is entering me; what recently observed query should I run?", or (b) receive a query from a user (or user's tool) saying "I'm visiting this web site; which recent query should I pass (and, perhaps, how)?", or (c) receive a query from a user or user's tool saying "I've recently made queries on these sites; which one's query should I forward to this new site and how?" Embodiments receiving queries of type (c) may be described as being the safest from a privacy perspective (since the user's queries are retained within the user's site).

In some embodiments the usage data 110 may comprise URLs that have a basic form of:

http://web.site.com/dir$_1$/dir$_2$/
page?kwd$_1$=val$_1$&kwd$_2$=val$_2$& ... &kwd$_n$=val$_n$ where kwd$_i$ are "query keywords" and val$_i$ are the corresponding provided values, and the web site indication and interest indication are obtained by extracting information from these URLs. The web site indication may be taken to be all or part of the hostname portion of the URL (e.g., "web.site.com") or it may include other parts of the remainder of the URL, such as a prefix of the path (e.g., "dir$_1$/dir$_2$"), the presence or absence of certain query keywords (e.g., "keywords named 'q' and 'store' but no keyword named 'dept'"), or a particular keyword taking a particular value (e.g., "dept='books'").

Logic instructions in system 100 may use one or more sets of rules to determine which parts of the URL correspond to the web site indication may differ for different web sites. The actual web site indication may comprise the pieces of the URL that are used to indicate the web site or it may take some other form such as a hash of that information or a predetermined record number or database key. The interest indication may similarly be extracted from (or derived from or based on information extracted) the URL. In some embodiments, for each web site one or more query keywords are identified and the interest indication is based on the values for those keywords, if they exist. It should be noted that some URLs in the usage data 110 may not result in extracted interest associations, reflecting either that these URLs do not contain an indication of interest or that the system does not know how to recognize the indication of interest contained in them. Some URLs may contain more than one indication of interest, which may result in the extraction of one or more interest associations.

In some embodiments the web site indication and/or interest indication may be contained in the usage data 110 other than in URLS. Examples of such other means include, without limitation, being contained in logged HTTP headers (or similar query information for other protocols), being contained in returned HTTP headers (or similar returned information for other protocols), being contained in the content of retrieved pages, being displayed text of a hypertext link used to initiate a retrieval, being contained in the content of pages interactions with which may lead to retrieved pages, being stored in database records, or being inferred by a monitoring process. In some embodiments more than one web interaction may lead to an extracted interest association. In one such embodiment, if the usage data 110 contains a URL for a search engine such as Google and a subsequent URL that the usage data 110 indicates or implies was retrieved based on clicking on one of the results proffered by the search engine, an extracted interest association may contain the web site indication taken from the second URL and the interest indication taken from the first URL.

The usage data 110, data mining logic instructions 120, and the model 130 portion of the system 100 may be grouped together to define a model development process or system. The model development process may be deployed infrequently due to the significant amount of computational and time resources that may be required to perform data intensive operations. Each of the major processes included in the model development process may be performed in parallel on different partitions of the data, involving only a few global merge steps.

The model 140 provides a rank ordering of strength of association between web sites having common search queries. In some embodiments, the system 100 may employ a notion of transitivity in building the model 130, so that if web sites A and B are strongly correlated, and site C, which does not have many associated searches has all or most of them in common with site B, the model may infer a quantified association between A and C even though they may actually not have any searches in common. Two web sites are strongly correlated if the presence of an interest indication associated with one web site allows the inference that the web site will also be associated with the other web site. Such a measure may be computed by any of a number of methods including known algorithms such as, for example, Information Gain, cosine similarity, or Pearson's correlation coefficient. Correlation may also be computed by computing the ratio of the intersection of the two sets to either of the two sets or to their union.

In general, the quantified association between two sites A and C may be based on information within the interest associations upon which the quantified associations between sites A and B and between sites B and C may be based. Such contribution from third sites may be called "transitive inference". In addition the phrase "in common" may not require strict equality.

In some cases, the search queries may be normalized (e.g., converted to lower-case, having punctuation and extra spaces removed, spelling regularized, accent marks removed, obvious typographical errors corrected, stopwords removed, or subject to other such modifications) and the comparison performed on the result. In other cases, the system may, by advanced textual or contextual analysis, determine that two queries share a common salient "core" and are therefore "the same". More straightforwardly, the system 100 may define a distance metric between queries based on, e.g., number of words in common and number of common words in the same order or based on a computed edit distance (e.g., Levenshtein distance) and treat different queries as "partially (but quantifiably) the same". It is understood that any combinations of these approaches may also be deployed. When query strings are non-textual, other normalization methods and distance metrics may be used.

Figure 1B:
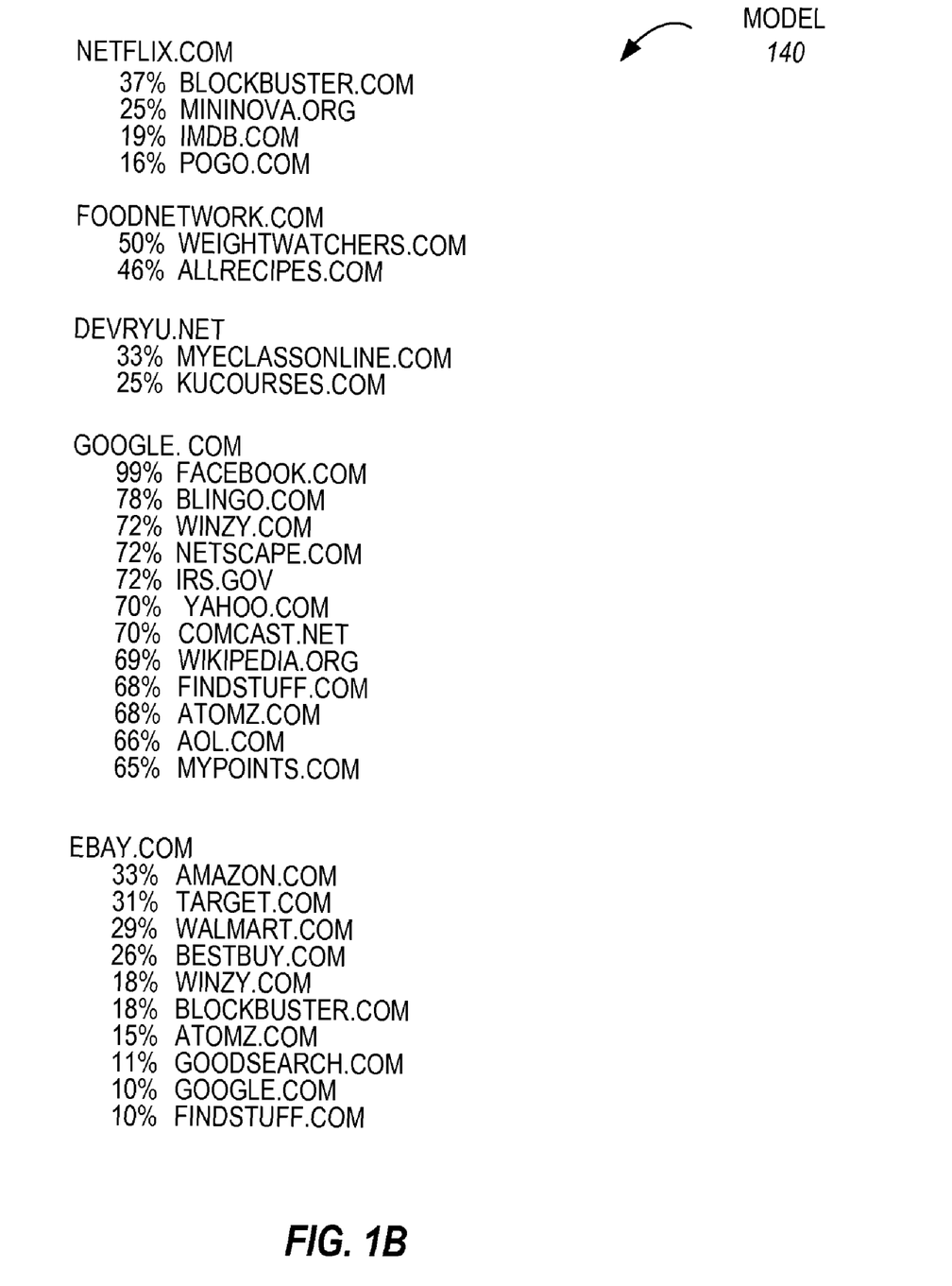
FIG. 1B illustrates web site-to-web site associations described by a model of FIG. 1A, according to an example embodiment.

FIG. 1B illustrates exemplary web site-to-web site associations described by a model described with reference to FIG. 1A, according to some example embodiments. Referring to FIG. 1B, the model 140 indicates that searches performed at a target web site 'netflix.com' are also frequently associated with blockbuster.com (37% of the time), with mininova.org (25% of the time), with imdb.com (19% of the time), and with pogo.com (16% of the time). Additional details of the process to develop the model 130 are described with reference to FIG. 2 and additional details of the process to deploy the model 140 are described with reference to FIG. 3.

Referring to FIGS. 1A and 1B, in some example embodiments, the 'web site' may identified by extracting a hostname from an associated URL, e.g., extracting the server name mygarden.webhosting.com or shoesales.webhosting.com. In some cases, the web site may be identified by using a part of the URL's hostname or other information contained in the URL, such as portions of a path or concurrently occurring query fields. In some applications, the web site may be the domain: so that www17.google.com is treated as google.com. In some cases, the web site may include a portion of the URL that distinguishes different sites: webhosting.com/mygarden/ or webhosting.com/shoesales/. In some example embodiments, the web site may be identified as a portion of a true web site, with differentiation taken from the URL. For example, searches within "Movies & TV" on Amazon may contain a text string 'url=search-alias%3Ddvd' in them while searches within 'software' may contain a text string 'url=search-alias%3Dsoftware'.

For web sites such as Amazon.com, which have several distinct types of products, each such 'search-alias' may be treated as a separate web site for purposes of building the model 140 and determining which Amazon searches carry over to other sites. In some applications, it may be preferable to treat all such 'departments' within a web site as simply "Amazon" when deciding which searches from other sites should be carried over to Amazon. Alternatively, a multi-department or conglomerate type web site such as Amazon.com may request more focused searches when the user navigates to one of its departments. Such patterns may be provided by the web site or may be derivable by parsing searches from a site and determining portions of search strings that may be common and appear to be mutually exclusive.

The above described associations between web sites may be quantified based on a similarity measure between pairs of sites sharing one or more common interest indications such as common queries. A similarity metric may be derived between web sites based on search terms they may have in common. In an alternative embodiment, user behavior (e.g., web sites visited) around making searches may also contribute to the similarity measure. This technique may allow sites that may not involve searches to contribute to the determination that, e.g., "this (searched) site appears to be a movie site". It may be useful in considering sites that may have too few searches to be able to link them directly to other sites.

In some alternative embodiments, the quantification may be generalized to a distance metric that allows the identification of sites that may not have much in common with each other but are each similar to other sites. Several means of performing this generalization are possible. One approach may be to treat the pair-wise similarity as an 'attractive force' and perform graph relaxation on the graph, treating the Euclidean distance on the resulting graph as the distance measure between sites. To accomplish this, the web sites may be treated as nodes in a graph in some multi-dimensional space, and the observed pairwise similarity (or lack thereof) may be used to compute an ideal length for the edges between pairs of nodes. Edges may be treated as springs (or other similar physical objects) that desire to stretch or shrink to their ideal length and a physical simulation may be performed in which nodes are moved around in the space until a configuration is found that minimizes the stress on any node based on its edges. The resulting positions of the nodes in the space induces a distance measure that can be used to determine a similarity metric between any two web sites based on the notion that if the corresponding nodes are closer together the web sites are more similar.

In some embodiments, when sites establish a relationship with a web personalization provider (e.g., an entity that may offer products and services to a target web site to improve users web surfing experience), such sites can identify sites to which they consider themselves similar. Such sites, when identified by the web personalization provider as target web sites, could get searches both from these identified sites and from sites discovered to be similar to them. In some example embodiments, these initially identified sites can be used to establish an initial placement for the web site's node. This may be useful for new sites that may not have established search histories to use for discovering associations.

The system 100 can also include means for monitoring web interactions 150 to extract the interest associations 152. The web interactions 150 may include user queries or other behavior that may be indicative of interests of a user, and means for extracting and storing the interest associations 152 based on the web interactions. Such storing may involve recording relevant information to a file system, to a storage device, to a database, to a remote server, to the memory of the computer on which the extraction takes place, or otherwise to enable the interest indications to be available when needed. For example, web interactions 150 may include a sequence of URLs visited by a user during a specified time interval on one or more computers.

The interest associations 152 may be extracted from data (e.g., URLs and HTTP headers) associated with the web interactions in the same manner as described above with respect to extracting interest associations from user data when building the model 130 and methods specifically described with respect to extracting interest associations from monitored web interactions may also be applied to extract interest associations from user data. That is, the same methods and processes may be deployed to extract the interest associations at runtime (e.g., use of the model 140) as at build time (e.g., develop the model 130). Note that neither the format of the interest associations nor the method used to extract them from web interactions need be the same as the format or extraction method used when building the model that may be used to process the interest associations extracted from web interactions. In some embodiments, data from which interest associations may be extracted may include observation of the user interacting with other software systems or devices (e.g., telephones, televisions, portable music players). In some embodiments, interest associations 152 may be extracted based on a detection of a pattern among multiple web interactions. In a particular embodiment, the processing may use the anchor text associated with the links that the user may click on as a target, e.g., after the user searches for 'potter goblet' the user may click on a link labeled 'Harry Potter and the Goblet of Fire DVD', which may reveal additional information about what the user may be interested in. Arbitrary text features from page bodies or page titles, such as bi-grams or text on the pages determined to likely represent product names may also be used.

As described earlier, the model 140 describes quantified associations between an associated web site and a target web site with respect to their common interest indications (e.g., search queries). In some embodiments, a top ranked interest indication 162 is selected from a ranked list of interest indications 160 (e.g., based on relative ranking) that may be obtained from the interest indications in the extracted interest associations, where the ranking takes into account the quantified associations between the target web site and web sites associated in the interest associations with the interest indications. In some embodiments, the top ranked interest indication 162 is an interest indication associated with a web site most strongly associated (out of web sites associated with queries on the ranked list 160) with the target web site as defined by the model 140. For example, if the target web site that is to be personalized is netflix.com then any of the user's interest indications from blockbuster.com, mininova.org, imdb.com, and pogo.com web sites are ranked by the model 140 as being greater than interest indications at (unrelated) web sites such as shoes.com or sailboats.com web sites. In some embodiments, other factors (e.g., recency or frequency of query or a measure of 'importance' of a web site) may be taken into account and may lead to a ranked list 160 such that the top ranked interest indication 162 may be associated with a web site other than one most strongly associated with the target web site.

In some embodiments, in order to rank the interest indications 160, inputs may be received from (a) user interaction history from the interest associations 152, (b) the model 140, and (c) the target web site 170 the system 100 is trying to personalize. In a particular embodiment, the ranked interest indications 160 may be constructed based on a combination of an input from the model 140 and a time stamp associated with the user query. The top ranked interest indication 162 may be sent to the target web site 170 for creating a personalized landing page for the user, e.g., by personalizing an otherwise-generic "entry page" or other page with content and advertising items that reflect the user's previous interest indication(s) at related sites.

In a particular embodiment, the target web site may receive several ones of the top ranked interest indications instead of only one as the top ranked interest indication 162. That is, the interest indications sent to the target web site may include some or all interest indications which match configurable selection criteria. Such selection criteria may include being within the top ranked interest indications, where the number of such interest indications is configured or adaptively determined or having a computed score, used in determining rankings, that exceeds a configured or adaptively determined threshold. The interest associations 152, ranked list of interest indications 160, the model 140 and the personalized target web site 170 portion of the system 100 may be grouped together to define a model deployment process. The model deployment process may be deployed for on-line applications.

In some embodiments, the recorded queries included in the interest associations 152 are kept on a client computer and the model 140 is also accessible by a process (e.g., a process monitoring user web interactions) executing on the client computer, the client computer being associated with a user, along with an indication of which sites are eligible to receive them. The client computer is thus enabled to include the top ranked recent searches along with the original HTTP request for the site's content. In some embodiments, information included in the interest associations 152 and the model 140 may be stored on a server that both the user and the web site have a relationship with. In this embodiment, the queries may be sent to the server, either as they are generated or periodically. When the web site desires to obtain the top relevant searches for a given user, it hands the server an indicator of its own identity and, optionally, a proffered identifier provided by the user. A user identifier may preferably be an encryption, using the server's public key, of information including a true user identifier, a blinding factor, and, perhaps, the web site. This may allow the user to obtain the functionality without giving up anonymity and allowing the site (or multiple sites) to track their behavior between visits.

In some embodiments, the recorded queries included in the interest associations 152 are kept on the client computer and the model 140 is executable on a server computer. In this embodiment, when a new target web site is identified, the client transmits to the server (or has previously caused to be transmitted to the server) information about the web sites (or a subset thereof on which the user has recently performed queries, preferably without also sending information about the queries themselves. The server responds with a ranked list of such web sites based on their quantified associations with the target web site (in some embodiments along with an indication of the strength of the association). The client then identifies queries associated with some or all of the web sites on the returned list and passes these queries to the target web site. In some of these embodiments the server also returns an indication of how to pass queries to the particular target web site. In some of these embodiments, the queries are passed as part of the HTTP request in a suitable format.

In a particular embodiment, the system 100 may, in conjunction with software on the client machine, independently propose or initiate a search on one or more web sites of its choosing and automatically display results of an initiated search query to the user. For example, the system 100 could note that a user is making a search on book sites and proffer other sites that the user may want to visit. Alternatively, the system 100 may run the search queries on other sites itself, perhaps opening other browser tabs behind the user's focal tab. In such a system, a user search for 'Harry Potter' on Netflix may result in tabs for the same search on Amazon's movie section, IMDB, and Blockbuster, and the user would only have to click to open the tabs rather than re-running the search or even having to think which other sites to navigate to. In some embodiments, the initiated search results may be combined into a single Google-like page, either automatically or via an easily-invoked "Search other relevant places" button or right-button menu item integrated with the user's web browser, operating system, or other tool. In such embodiments, the relationship between an IT provider and the chosen web sites could still exist, with preference given to those sites, or the service may be performed solely for the benefit of the user.

Cluster analysis, which relates to grouping or segmenting a collection of objects (also called observations, individuals, cases, or data rows) into subsets or 'clusters', may be used to develop a model. Objects within each cluster are determined to be more closely related to one another than objects assigned to different clusters. A degree of similarity (or dissimilarity) is determined between the individual objects being clustered. In some embodiments, the model 130 may be developed by using the clustering technique. Web sites may be grouped into a cluster based on the quantified associations between pairs of the web sites or otherwise based on the search queries associated with the web sites. This allows the identification of sets of web sites that can usefully be treated as similar or related such as:

| | |
|---|---|
| A1books.com == Bibilio.com == Textbooks.com | Cluster A |
| CDnow.com == CDuniverse.com == CDbaby.com | Cluster B. |

In this embodiment, when a user accesses any one site included in the cluster B, past searches associated with other web sites within the cluster B (e.g., CDnow.com, CDuniverse.com, and CDbaby.com) may be carried over, while past searches from sites within cluster A may be excluded. The model 130 may be developed by using well-known clustering algorithms such as K-means, latent Dirichlet allocation (LDA), approximate clique-finding and others. For some of the algorithms, the configuration of the clusters entails the known challenges of determining an appropriate number of clusters. In some applications, such a clustering model may be overly simple for the complexities of the real world, e.g., some web sites such as Amazon.com sell both CDs and books. These may be treated via hierarchical clustering techniques, that would associate a hierarchical cluster 'over' the clusters A and B and this higher level cluster may also include Amazon.com web site. As an alternate, a conglomerate web site such as Amazon.com may be partitioned into multiple sites such as Amazon.CD.com or Amazon.Books.com for clustering purposes. Given a web site target X that the user is arriving at, any queries from the closest/lowest-level clusters are preferred compared to those of higher clusters. For example, if a web personalization provider is attempting to personalize for amazon.books.com, then the provider may prefer queries from barnesnoble.books.com, followed by the provider selecting queries from any of the other three sites forming cluster A. Thus, the hierarchical clustering provides a useful distance function that "does the right thing", especially in relation to ranking down other queries the user has performed at far less related sites, e.g. shoes.com.

Another technique of clustering may utilize publicly available lists or other lists that purport to enumerate web sites that are related by some definition. There exist public collections or clusters of web sites by topic, e.g., there exists a public collection of approximately 1319 domains where cars are sold. These publicly accessible lists may be used as clustered groups of sites having common material or content.

In some embodiments, server 102 uses other means to indicate a subset of the list of web sites provided by client 104 and, optionally a ranking or scoring thereof. For example, the subset may be indicated by a list or array of Boolean values or a bitmask having bits corresponding to each of the web sites transmitted from client 104 or by a list of indices referring to the elements of the transmitted list. Rankings or scorings may be implemented by a list or array of numbers corresponding to the transmitted list or the identified subset. If no ranking or scoring is provided, the indicated subset may be considered to consist of those that are considered to be sufficiently good. The subset may comprise the entire set. In some embodiments, client 104 may use the information from server 102 among other information in choosing the interest indications to send to target web site 170 and may sometimes choose to send to target web site 170 interest indications not associated with web sites indicated by server 102.

Figure 2:
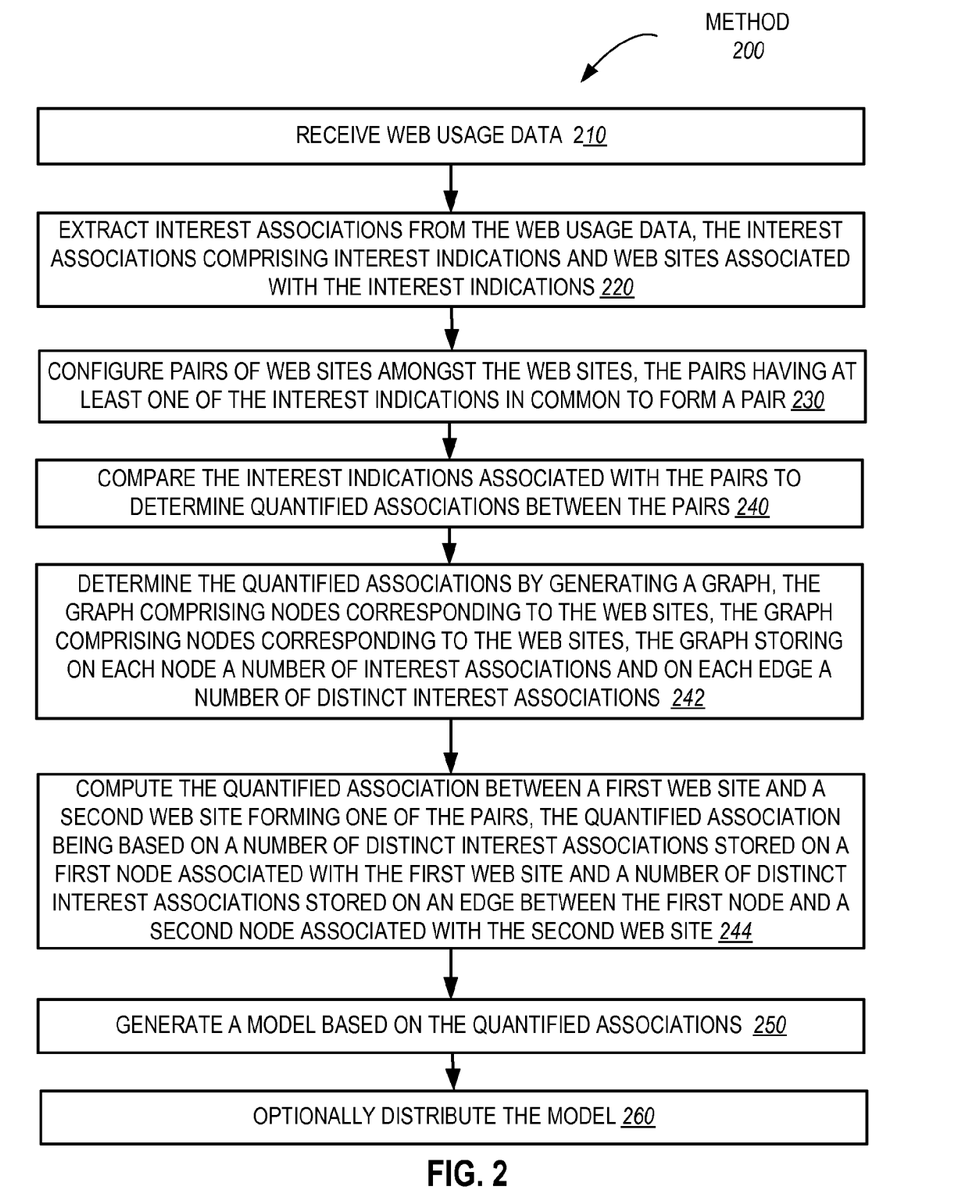
FIG. 2 is a flow chart of a method for developing a model described with reference to FIGS. 1A and 1B, according to an example embodiment.

FIG. 2 is a flow chart of a method 200 for developing a model described with reference to FIGS. 1A and 1B, according to an example embodiment. In a particular embodiment, the method 200 may be used for implementing the model development process in server 102 including developing the model 130.

At process 210, a large volume of web usage data (e.g., clickstream URLS), such as available from Nielsen/NetRatings, is received. At process 220, interest associations are extracted from the web usage data, the interest associations comprising interest indications and web sites associated with the interest indications. At process 230, pairs of web sites amongst the web sites are configured, the pairs having at least one of the interest indications in common to form a pair.

At process 240, the interest indications associated with the pairs are compared to determine quantified associations between the pairs. At process 250, a model based on the quantified associations is generated. At process 260, the model is optionally distributed.

It is understood, that various processes described above with reference to the method 200 may be added, omitted, combined, altered, or performed in different order. For example, a process 242 and process 244 may be added before the process 240. At process 242, the quantified associations are determined by generating a graph, the graph comprising nodes corresponding to the web sites, the graph storing on each node a number of interest associations and on each edge a number of distinct interest associations. At process 244, a quantified association between a first web site and a second web site forming one of the pairs is computed, the quantified association being based on a number of distinct interest indications stored on a first node associated with the first web site and a number of distinct interest associations stored on an edge between the first node and a second node associated with the second web site.

In some embodiments, this process 242 may be implemented by the following sub-processes: a) Reading the sorted data incrementally, b) For each unique interest indication, determining the list of distinct sites involved (from contiguous lines), c) For each site involved, incrementing its number of interest indications, and d) For each pair of sites, incrementing the search count on the edge between the site nodes. For efficiency purposes, interest indications may be ignored when they are determined to be overly common and appear on extremely many different web sites, thereby avoiding any large quadratic runtime. In some embodiments, the interest indications may be optionally normalized, e.g., by lowercasing, converting accented characters to a canonical form, removing punctuation, removing stop words, and performing other modifications. In some embodiments, the quantified association between a first site and a second site is (or is based on) the fraction of the number of distinct interest indications stored in the first site's node represented by the number of distinct interest indications stored on the edge leading from the first site to the second site.

In some embodiments, the method 200 may include a further step of reducing the model 130 by removing quantified associations and web sites. Such a reduction may be for the purpose of reducing the size of the representation of the model 130, for the purpose of improving the efficiency of using the model 130, or for other reasons. The decision to remove a quantified association may be based on a computed score, which may be computed based on, e.g., the value of the quantified association and other values (e.g., popularity) associated with one or both of the web sites involved in the quantified association. The decision to remove may be based on the computed score being below a determined threshold or based on its relationships to the computed scores of other quantified associations within the model 130, perhaps limited to other quantified associations associated with one or the other of its associated web sites. The decision to remove a web site may be based on a computed score which may be computed based on, e.g., scores or values of quantified associations associated with the web site and other values associated with the web site. The decision to remove may be based on the computed score being below a determined threshold or based on its relationships to the computed scores of other web sites within the model. The process of reducing the model 130 may be an iterative process, with scores periodically recomputed.

Figure 3:
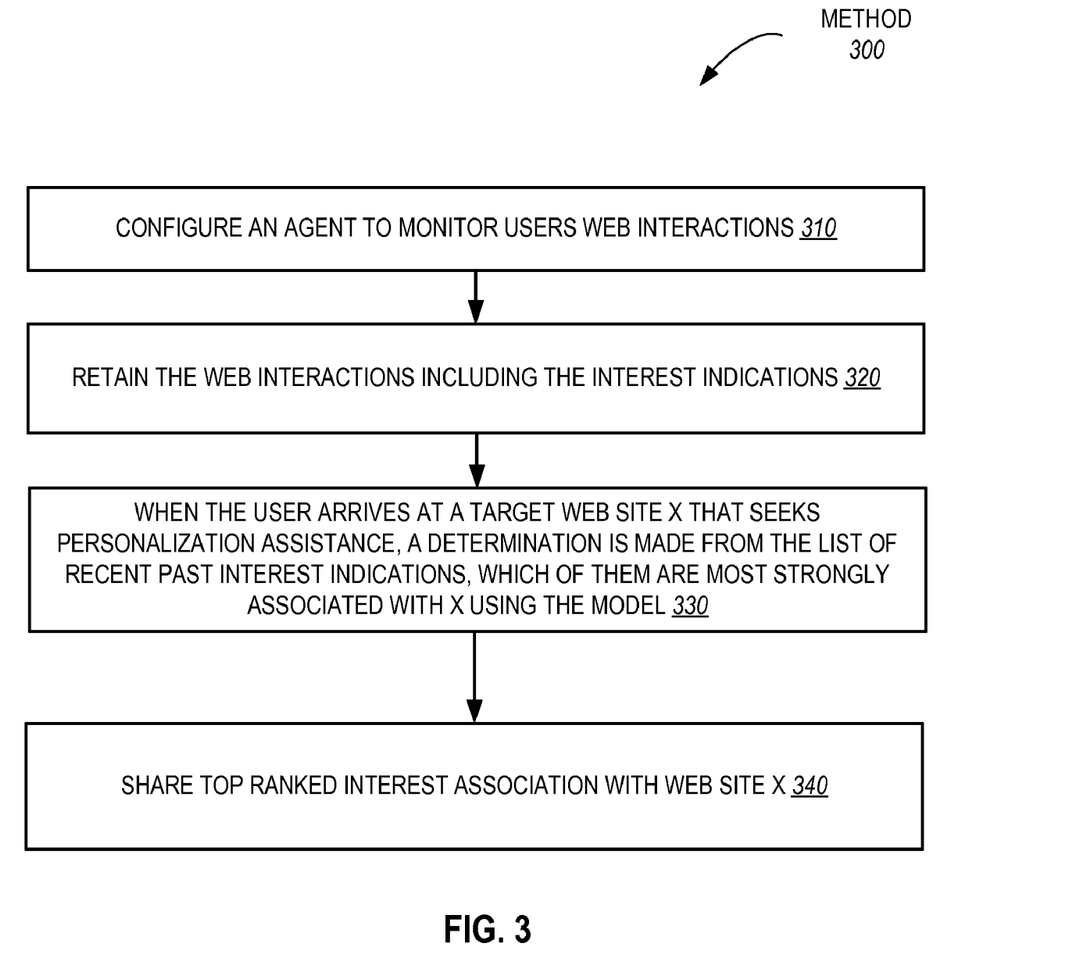
FIG. 3 is a flow chart of a method for deployment of a model described with reference to FIGS. 1A and 1B, according to an example embodiment.

FIG. 3 is a flow chart of a method 300 for deployment of a model described with reference to FIGS. 1A and 1B, according to an example embodiment. In a particular embodiment, the method 300 may be used in client computer 104 to implement the model deployment process including deploying the model 140.

At process 310, a user's web browser may be configured to include an agent that monitors the user's web interactions (e.g., the sequence of URLs visited). Such monitoring can be performed by the user's browser (e.g., by a plug-in), by a proxy running on the user's machine, or by a remote proxy used by the user. At process 320, each interest indication performed is recorded, including the web site it was performed at, plus optionally a timestamp. In some embodiments, only the most recent search or a reduced number of recent interest indications at each web site may be retained. In others, complete interest indication histories may be available. In some embodiments monitoring may take place on more than one machine associated with the user.

At process 330, when the user arrives at a target web site X that seeks personalization assistance, a determination is made from the list of recent past interest indications which of them are most strongly associated with X using the model 140. For example, if X=ebay.com, then according to the sample data shown in FIG. 1B, any user interest indications from amazon.com would be most highly ranked, then those from target.com, then those from walmart.com, and then potentially others identified by the model 140. Interest indications at sites not associated with ebay.com in the model would receive the lowest ranking or be removed from consideration, e.g., in this example, previous user interest indications from sites such as blogger.com or windermere.com. In some embodiments, the quantified association between X and other web sites may be combined in some manner with the age or recency of the interest indications at other web sites in order to produce a final score to use for ranking the past interest indications. There are a large variety of well known methods to combine multiple objectives.

At process 340, the top ranked interest indication is shared with the site X in the HTTP request, so that it may personalize a web page such as the front page or the landing page for the user. In some embodiments, several of the interest indications may be shared, e.g., the top 10 ranked interest indications or interest indications that have some computed score that exceeds a specified or determined threshold. As an option, the interest indications may be shared after optionally eliminating near/rough duplicates in order to encourage diversity. It is understood, that various processes described above with reference to the method 300 may be added, omitted, combined, altered, or performed in different order.

Figure 4:
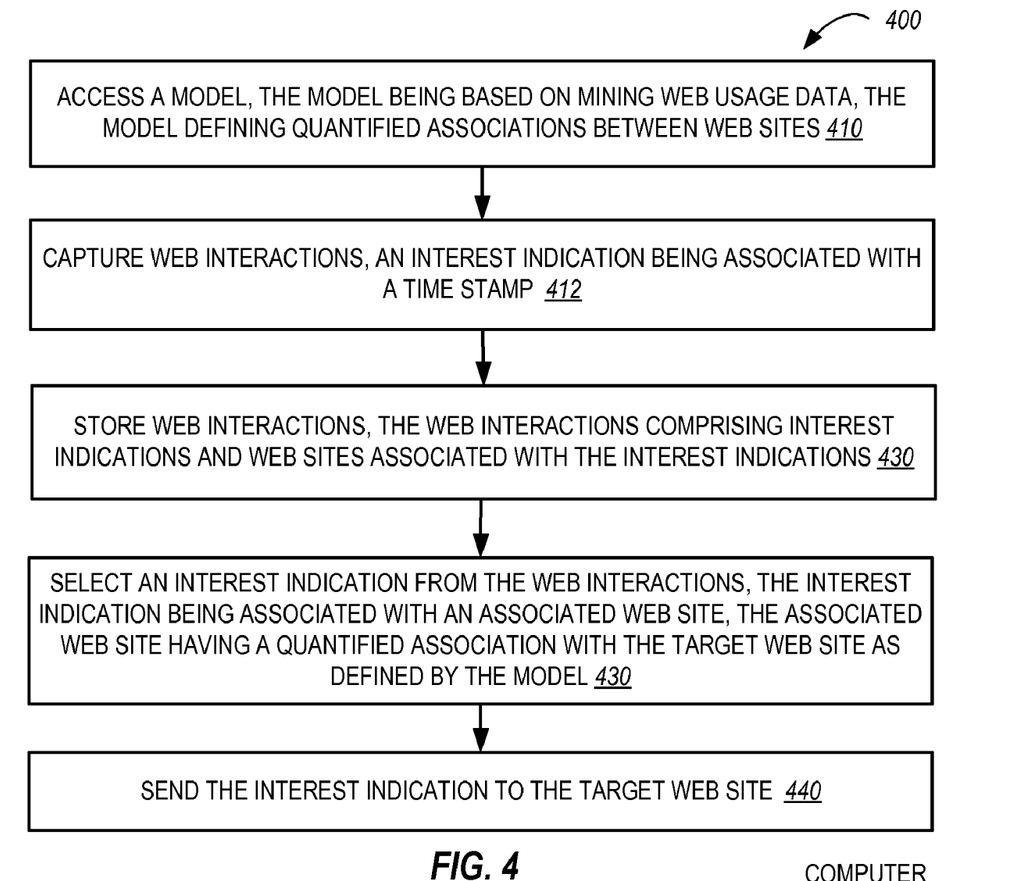
FIG. 4 is a flow chart of a method for personalizing a target web site, according to an example embodiment.

FIG. 4 is a flow chart of a method 400 for personalizing a target web site, according to an example embodiment. In some embodiments, the method 400 is used in client computer 104 to personalize a web site using the system 100 described with reference to FIGS. 1A, 1B, 2, and 3.

At process 410, a model is accessed, the model being based on mining web usage data, the model defining quantified associations between web sites. At process 420, interest associations are stored, the interest associations comprising interest indications and web sites associated with the interest indications. At process 430, an interest indication is selected from the interest associations, the interest indication being associated with an associated web site, the associated web site having a quantified association with the target web site as defined by the model. At process 440, the interest indication is sent to the target web site.

It is understood, that various processes described above with reference to the method 400 may be added, omitted, combined, altered, or performed in different order. For example, with reference to the method 400, a process 412 may be added before the process 420. At process 412, the interest associations are captured, the interest indication being associated with a time stamp.

Figure 5:
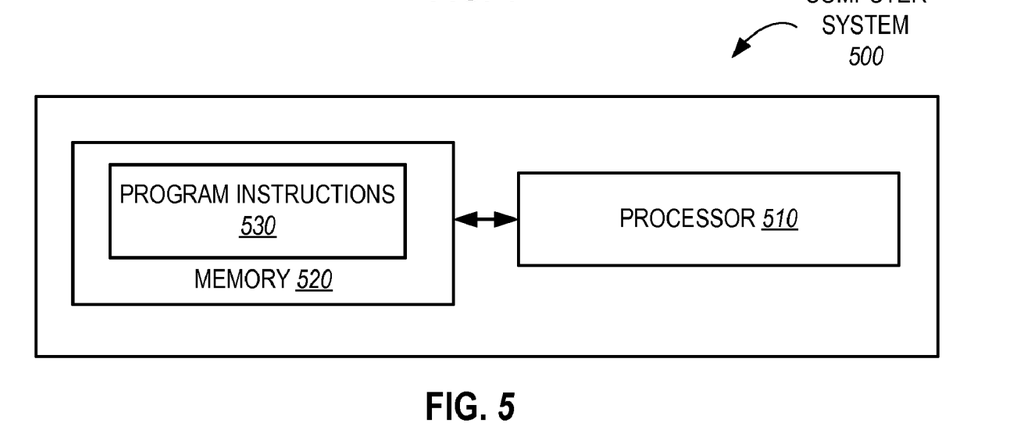
FIG. 5 illustrates a block diagram of a computer system, according to an example embodiment.

FIG. 5 illustrates a block diagram of a computer system 500, according to some example embodiments. The computer system 500 includes a processor 510 coupled to a memory 520. It should be understood that depending on the computing load more than one processor may be included in the computer system 500. The memory 520 is operable to store program instructions 530 that are executable by the processor 510 to perform one or more functions. It should be understood that the term "computer system" is intended to encompass any device having a processor that is capable of executing program or logic instructions from a memory medium. In some embodiments, the various functions, processes, methods 200, 300 and 400, and operations described herein may be implemented using the computer system 500. For example, the system 100 and components thereof, e.g., the client computer 104 or the server 102, may be implemented using one or more of the computer system 500.

The various functions, processes, methods, and operations performed or executed by the system 500 can be implemented as the program instructions 530 (also referred to as software or simply programs) that are executable by the processor 510 and various types of computer processors, controllers, microcontrollers, central processing units, microprocessors, digital signal processors, state machines, programmable logic arrays, and the like. In an exemplary, non-depicted embodiment, the computer system 500 may be networked (using wired or wireless networks) with other computer systems.

In various embodiments the program instructions 530 may be implemented in various ways, including procedure-based techniques, component-based techniques, object-oriented techniques, rule-based techniques, among others. The program instructions 530 can be stored on the memory 520 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Embodiments disclosed herein provide a web site personalization system that is operable to improve user experience in web surfing. That is, tools and techniques are disclosed to determine appropriate search transitivity by performing data mining operation on a large volume of web usage data. Similarity between web sites is determined from the web usage data. A target web site is more useful to a user since when visited by the user the web site automatically knows what the user is looking for and automatically displays the desired information to the user on a front page of the web site.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, web site customization is described. It is understood that the methods and systems described herein may be applied in solving the problem of determining web site-versus-web site similarity from the web usage data. The illustrative techniques may be used with any suitable data processing configuration and with any suitable servers, computers, and devices. In the claims, unless otherwise indicated the article "a" is to refer to "one or more than one".

What is claimed is:

1. A computer-implemented method comprising:
   accessing a model, the model is based on mining web usage data, the model defines associations between web sites;
   storing interest associations extracted from web interactions, the interest associations comprising interest indications and web sites associated with the interest indications;
   selecting an interest indication from the interest associations, the interest indication being associated with an associated web site, the associated web site having an association with a target web site as defined by the model; and
   sending the interest indication to the target web site.

2. The method of claim 1, wherein the interest indication comprises a search query previously performed at the associated web site, the search query being provided to the target web site for possible execution.

3. The method of claim 2, further comprising:
   receiving from a user an indication of a number of other web sites at which that user has entered search queries;
   determining a strength of an association between each of said number of other web sites and the target web site; and
   based on determining the strength of an association between each of said number of other web sites and the target web site, recommending that a search query used at one of said number of other web sites having a strongest association with said target web site, become a basis for a search query performed at said target web site.

4. The method of claim 3, in which said search queries entered at said number of other web sites is not provided when receiving data from the user.

5. The method of claim 1 further comprising:
   selecting the interest indication from the interest associations in accordance with a relative ranking of interest indications, the relative ranking being based on a quantified association.

6. The method of claim 1 further comprising:
   extracting the interest indication and the associated web site respectively from two distinct web interactions.

7. The method of claim 1 further comprising: determining one or more web sites at which to search based on the interest associations and the model.

8. The method of claim 1 further comprising:
selecting multiple interest indications resulting from multiple ones of the interest indications having a quantified association that matches selection criteria; and
sending the multiple interest indications to the target web site.

9. The method of claim 1 further comprising receiving from an agent the interest associations, the agent being configured to monitor the web interactions of a user.

10. The method of claim 1 further comprising:
performing the method on a client computer.

11. The method of claim 1 further comprising:
storing the interest associations;
sending to a server computer an identifier of the target web site and a list of web sites in the interest associations;
receiving from the server computer an indication of a subset of the list of web sites; and
selecting the interest indication to send to the target web site based on the indication of a subset.

12. A computer program product for web site personalization, the computer program product comprising:
logic instructions on a non-transitory computer readable storage medium executable to cause a computer processor to:
access a model, the model being based on mining web usage data, the model defining associations between web sites;
store interest associations extracted from web interactions, the interest associations comprising interest indications and web sites associated with the interest indications;
select an interest indication from the interest associations, the interest indication being associated with an associated web site, the associated web site having an association with a target web site as defined by the model; and
send the interest indication to the target web site.

13. The computer program product of claim 12 wherein:
the interest indication comprises a search query, the search query being previously entered by a user to seek information at the associated web site, the search query then being provided to the target web site for possible execution.

14. The computer program product of claim 12 further comprising:
logic instructions on the computer readable storage executable to cause the computer processor to:
select the interest indication from the interest associations in accordance with a relative ranking of interest indications, the relative ranking being based on a quantified association.

15. A method comprising:
receiving web usage data;
extracting interest associations from the web usage data, the interest associations comprising interest indications and web sites associated with the interest indications;
configuring pairs of web sites amongst the web sites;
comparing the interest indications associated with the pairs to determine associations between the web sites;
generating a model of the associations;
selecting an interest indication, the interest indication being associated with an associated web site, the associated web site having an association with a target web site as defined by the model; and
sending the interest indication to the target web site.

16. The method of claim 15 wherein the interest indications comprise search queries, the search queries being previously entered by a user to seek information.

17. The method of claim 15 further comprising: extracting the interest indications and the associated web sites respectively from distinct web interactions.

18. The method of claim 15 further comprising: determining the associations using transitive inference.

19. The method of claim 15 further comprising: configuring a processing of the web interactions, the processing including extracting information from a uniform resource locator (URL), the information extracted comprising the interest indication.

20. The method of claim 15 further comprising: receiving from a web site a list of other web sites viewed as similar to the web site.

21. The method of claim 5 further comprising: normalizing the interest indications.

22. The method of claim 15 further comprising: estimating the associations as a distance metric between two web sites, the distance metric being used to measure similarity between the two web sites.

* * * * *

UNITED STATES PATENT AND TRADEMARK OFFICE
CERTIFICATE OF CORRECTION

PATENT NO. : 8,352,396 B2  
APPLICATION NO. : 12/555638  
DATED : January 8, 2013  
INVENTOR(S) : George Forman et al.

Page 1 of 1

It is certified that error appears in the above-identified patent and that said Letters Patent is hereby corrected as shown below:

In column 16, line 39, in Claim 21, delete "claim 5" and insert -- claim 15 --, therefor.

Signed and Sealed this  
Second Day of April, 2013

Teresa Stanek Rea  
*Acting Director of the United States Patent and Trademark Office*